US012283178B2

(12) United States Patent
Gamble

(10) Patent No.: US 12,283,178 B2
(45) Date of Patent: Apr. 22, 2025

(54) MULTI-ANGLE TRIP ALARM APPARATUS, KIT AND METHOD

(71) Applicant: PYROCREATIONS, L.L.C., Loudon, TN (US)

(72) Inventor: Steven Gamble, Loudon, TN (US)

(73) Assignee: PYROCREATIONS, L.L.C., Loudon, TN (US)

( * ) Notice: Subject to any disclaimer, the term of this patent is extended or adjusted under 35 U.S.C. 154(b) by 896 days.

(21) Appl. No.: 17/447,233

(22) Filed: Sep. 9, 2021

(65) Prior Publication Data

US 2023/0070231 A1 Mar. 9, 2023

(51) Int. Cl.
*G08B 7/06* (2006.01)

(52) U.S. Cl.
CPC .................................... *G08B 7/06* (2013.01)

(58) Field of Classification Search
CPC ... G08B 7/06; G08B 1/02; G08B 7/08; G08B 13/12
USPC ........................................................ 116/7
See application file for complete search history.

(56) References Cited

U.S. PATENT DOCUMENTS 5,103,207 A 4/1992 Kerr et al.
5,207,579 A 5/1993 Campagnuolo

FOREIGN PATENT DOCUMENTS

WO WO 95/03522 2/1995

OTHER PUBLICATIONS

"The Quad 12 Gauge Perimeter Trip Alarm Kit—Gen 2.5." Trigger CannonsTM, Jun. 2021,https://web.archive.org/web/20210612204743/https://triggercannons.com/product/the-quad-12-gauge-perimeter-trip-alarm-kit-gen2/. (Year: 2021).*
Trigger Cannons. "The 'QUAD' Gen 2.5." YouTube, YouTube, Jul. 1, 2021, www.youtube.com/watch?v=1_beK2e5hyo. (Year: 2021).*
Trigger Cannons. "The QUAD 12 Ga Trip Alarm @ TriggerCannons. Com." YouTube, YouTube, Nov. 12, 2020, www.youtube.com/watch?v=j5XbKfqKoTE. (Year: 2020).*
Trigger Cannons. "The QUAD 12 Ga Trip Alarm Rundown From TriggerCannons. Com." YouTube, YouTube, Nov. 17, 2020, www.youtube.com/watch?v=hv1eaT0MGO4. (Year: 2020).*
Quad Alarm Gen 2.5 for sale TriggerCannons.com Jun. 2021, web.archive.org (Year: 2021).*
Screenshot, Gen 2.5 YouTube Video (Year: 2021).*
Screenshot, Overview YouTube Video (Year: 2020).*
Screenshot, TriggerCannons.com "The QUAD 12 Ga Trip Alarm Rundown From TriggerCannons.com" YouTube Video (Year: 2020).*
Website printout: https://fithops.com/products/12-gauge-perimeter-alarm.
Website printout: https://www.lonesentry.com/articles/intelligence-report/trip-wire-alarm.html Taken from Intelligence Bulletin (May 1944).
YouTube video at https://www.youtube.com/watch?v=rwZcDp16AhY (May 8, 2018).
Website printout: https://fithops.com/collections/perimeter-trip-alarms/products/209-shotgun-primer-trip-alarm.

* cited by examiner

*Primary Examiner* — Kristina M Deherrera
*Assistant Examiner* — Evan Mancini
(74) *Attorney, Agent, or Firm* — ROBINSON IP LAW, PLLC

(57) ABSTRACT

A multi-angle trip alarm apparatus, a kit including parts for a multi-angle trip alarm apparatus, and a method for setting a multi-angle trip alarm apparatus using such parts.

15 Claims, 16 Drawing Sheets

MULTI-ANGLE TRIP ALARM APPARATUS, KIT AND METHOD

FIELD

This disclosure relates to the field of trip alarms. More particularly, this disclosure relates to a multi-angle trip alarm using flash bang shells.

BACKGROUND

Perimeter alarms using flash bang shells or other similar devices have been used for many years. Generally, a shell is placed into a perimeter trip alarm device and a spring-loaded internal mechanism in the device is designed to rapidly contact an attached shell if the trip alarm is triggered. This contact results in the shell firing and alerting others that the trip alarm has been triggered. The internal mechanism in such devices is often triggered by the removal of a pin or a plate that is tied to a distal object such as a tree using a wire or string. When someone trips over the wire or string, the pin or plate is moved, thereby triggering the trip alarm device so that the shell is fired.

When perimeter alarms like the ones described above are used, it is necessary to use more than one perimeter alarm to obtain 360 degree coverage in a given area because a single perimeter alarm is unable to provide trip wire coverage in up to 360 degrees around such perimeter alarms. What is needed, therefore, is a multi-angle trip alarm apparatus wherein a single trip alarm apparatus can provide 360-degree coverage around the single trip alarm apparatus.

SUMMARY

The above and other needs are met by a multi-angle trip alarm kit, apparatus and method. In one aspect, the multi-angle trip alarm kit includes (A) a block comprising (i) a first lengthwise side, a second lengthwise side, a third lengthwise side, a fourth lengthwise side, a first end, and a second end; (ii) a lengthwise hole extending lengthwise through the center of the block, the hole including a narrow section extending a first length of the lengthwise hole and a wide section extending a second length of the lengthwise hole wherein the narrow section and the wide section are separated by an interior ridge inside the block; and (iii) a first slot extending into the block starting at a first slot proximal end along the first lengthwise side and extending to a first slot distal end defined by a symmetrical convex interior wall; (B) a plate configured to slide into and rest inside the first slot of the block wherein the plate is sized to extend out beyond the block, the plate including a plurality of apertures therethrough; (C) a rod assembly configured to fit inside the lengthwise hole of the block, the rod assembly comprising (i) a rod including a first end and a second end; (ii) a handle attached along the first end of the rod; and (iii) a first sleeve attached proximate to the second end of the rod; and (D) a coil spring including a first spring end and a second spring end, the coil spring configured to fit around the rod and be bounded at the first spring end by the interior ridge inside the block and at the second spring end by the first sleeve. The rod may further include a threaded section proximate to the first end of the rod; and a second sleeve including interior threading operable to mate with the threaded section of the rod so that the second sleeve is operable to be adjusted up or down along the threaded section of the rod. The rod may further include a rod aperture extending widthwise through the rod; and a pin configured to extend through the rod aperture. The plate preferably includes a rectangular shape including four rounded corners and wherein the plurality of apertures comprises four apertures, one aperture proximate to each corner of the plate. The block preferably further includes a plurality of widthwise holes extending through the block from the first lengthwise side to the third lengthwise side. The block preferably further includes a second slot oriented widthwise along the second end of the block wherein the second slot is partially open, facing out the second end of the block, and wherein the second slot is configured for receiving the flared end of a flash bang shell.

In another aspect, a multi-angle trip alarm apparatus is disclosed, the multi-angle trip alarm apparatus comprising (A) a block comprising (i) a first lengthwise side, a second lengthwise side, a third lengthwise side, a fourth lengthwise side, a first end, and a second end; (ii) a lengthwise hole extending lengthwise through the center of the block, the hole including a narrow section extending a first length of the lengthwise hole and a wide section extending a second length of the lengthwise hole wherein the narrow section and the wide section are separated by an interior ridge inside the block; and (iii) a first slot extending into the block starting at a slot proximal end along the first lengthwise side and extending to a slot distal end defined by a symmetrical convex interior wall; (B) a plate resting inside the first slot of the block wherein the plate extends out beyond the block, the plate including a plurality of apertures therethrough; (C) a rod assembly comprising (i) a rod including a first end and a second end wherein the rod extends into the lengthwise hole of the block; (ii) a handle attached along the first end of the rod; and (iii) a first sleeve attached proximate to the second end of the rod wherein a first end of the first sleeve is engaged with a first edge of the plate; and (D) a coil spring including a first spring end and a second spring end, the coil spring located around the rod wherein the coil spring is bounded in a compressed state under pressure at the first spring end by the interior ridge inside the block and at the second spring end by a second end of the first sleeve, wherein the coil spring, block, and rod assembly are operable to eject the second end of the rod out the second end of the block if the plate is moved in a way that permits the first sleeve of the rod assembly to slip by the plate through the lengthwise hole in the block. The plate preferably comprises a rectangular shape including four rounded corners and wherein the plurality of apertures comprises four apertures, one aperture proximate to each corner of the plate. The block preferably further comprises a plurality of widthwise holes extending through the block from the first lengthwise side to the third lengthwise side. The block preferably further comprises a second slot oriented widthwise along the second end of the block wherein the second slot is partially open, facing out the second end of the block and wherein the second slot is configured for receiving the flared end of a flash bang shell. The multi-angle trip alarm apparatus is preferably configured such that the plate can be pulled from any horizontal direction, a full 360 degrees around the multi-angle trip alarm apparatus.

In another aspect, a method for setting a multi-angle trip alarm apparatus is disclosed, the method comprising (A) attaching a multi-angle trip alarm apparatus to a vertical structure, the multi-angle trip alarm apparatus comprising (i) a block comprising (1) a first lengthwise side, a second lengthwise side, a third lengthwise side, a fourth lengthwise side, a first end, and a second end; (2) a lengthwise hole extending lengthwise through the center of the block, the hole including a narrow section extending a first length of the lengthwise hole and a wide section extending a second length of the lengthwise hole wherein the narrow section and the wide section are separated by an interior ridge inside the block; and (3) a first slot extending into the block starting at a first slot proximal end along the first lengthwise side and extending to a first slot distal end defined by a symmetrical convex interior wall; (ii) a plate configured to slide into and rest inside the first slot of the block wherein the plate is sized to extend out beyond the block, the plate including a plurality of apertures therethrough; (iii) a rod assembly configured to at least partially fit inside the lengthwise hole of the block, the rod assembly comprising (1) a rod including a first end and a second end; (2) a handle configured to be attached along the first end of the rod; and (3) a first sleeve attached proximate to the second end of the rod; and (iv) a coil spring including a first spring end and a second spring end, the coil spring configured to fit around the rod and be bounded at the first spring end by the interior ridge inside the block and at the second spring end by the first sleeve; (B) placing the coil spring around the rod; (C) inserting the rod starting with the first end of the rod up through the lengthwise hole of the block starting at the second end of the block until the first end of the rod extends out the first end of the block; (D) attaching the handle to the rod; (E) pulling the rod assembly toward the first end of the block to compress the coil spring and create pressure between the block and the rod assembly; and (F) inserting the plate into the first slot such that the first sleeve is engaged with the plate. The block of the multi-angle trip alarm apparatus preferably further comprises a second slot oriented widthwise along the second end of the block wherein the second slot is partially open, facing out the second end of the block and wherein the second slot is configured for receiving the flared end of a flash bang shell, the method further comprising inserting a flared end of a flash bang shell into the second slot. The method may further include attaching a first end of a first trip wire to the plate and a second end of the first trip wire to a first distal object. The method may further include inserting the flared end of a flash bang shell into the second slot. The method may further include attaching a first end of a second trip wire to the plate and a second end of the second trip wire to a second distal object, attaching a first end of a third trip wire to the plate and a second end of the third trip wire to a third distal object, and attaching a first end of a fourth trip wire to the plate and a second end of the fourth trip wire to a fourth distal object.

One important benefit of the apparatus disclosed herein is that it can be triggered from any horizontal direction, a full 360 degrees around the apparatus. Prior art devices are limited to about 180 degrees or less. This important benefit is made possible by the convex interior wall inside the first slot of the block which allows the plate to roll off the block from any horizontal direction. Another important benefit of the apparatus disclosed herein is the improved plate with multiple apertures wherein the plate extends out well beyond the second lengthwise side and the fourth lengthwise side of the block, thereby allowing extra distance from the block so that the plate can be pulled from any horizontal angle (360 degrees). The convex interior wall is a critical feature of the invention because it allows the multi-angle trip alarm apparatus to be triggered from any horizontal direction. The plate extending out beyond the second lengthwise side and the fourth lengthwise side is critical because it permits a trip wire to be attached to the plate and extend in any horizontal direction around the multi-angle trip alarm apparatus 100.

Another important improvement in some embodiments of the multi-angle trip alarm apparatus described herein includes the adjustable triggering capabilities of the rod assembly. The threaded section of the rod and the second sleeve located thereon provide a way to adjust the length at which the second end of the rod extends out from the second end of the block when the multi-angle trip alarm apparatus is triggered and fired. The second sleeve contacts the first end of the block which prevents the rod from moving further through the lengthwise hole. Because of threading inside the second sleeve, the second sleeve can be selectively moved along the threaded section of the rod to either allow for the second end of the rod to either extend further out of the second end of the block when fired or to lessen the extent to which the second end of the rod extends out of the second end of the block when fired. A reason this is important is that different sized flash bang shells might be used which might require an adapter device which might place such shells further away from the block or closer to the block. If a shell is farther away from the block, it is desirable for the second end of the rod to extend further out of the second end of the block when triggered. On the other hand, if a shell or adapter is closer to the block, it is desirable for the second end of the rod to extend less out of the second end of the block when triggered to prevent damage to such adapter and/or shell.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

Figure 1:
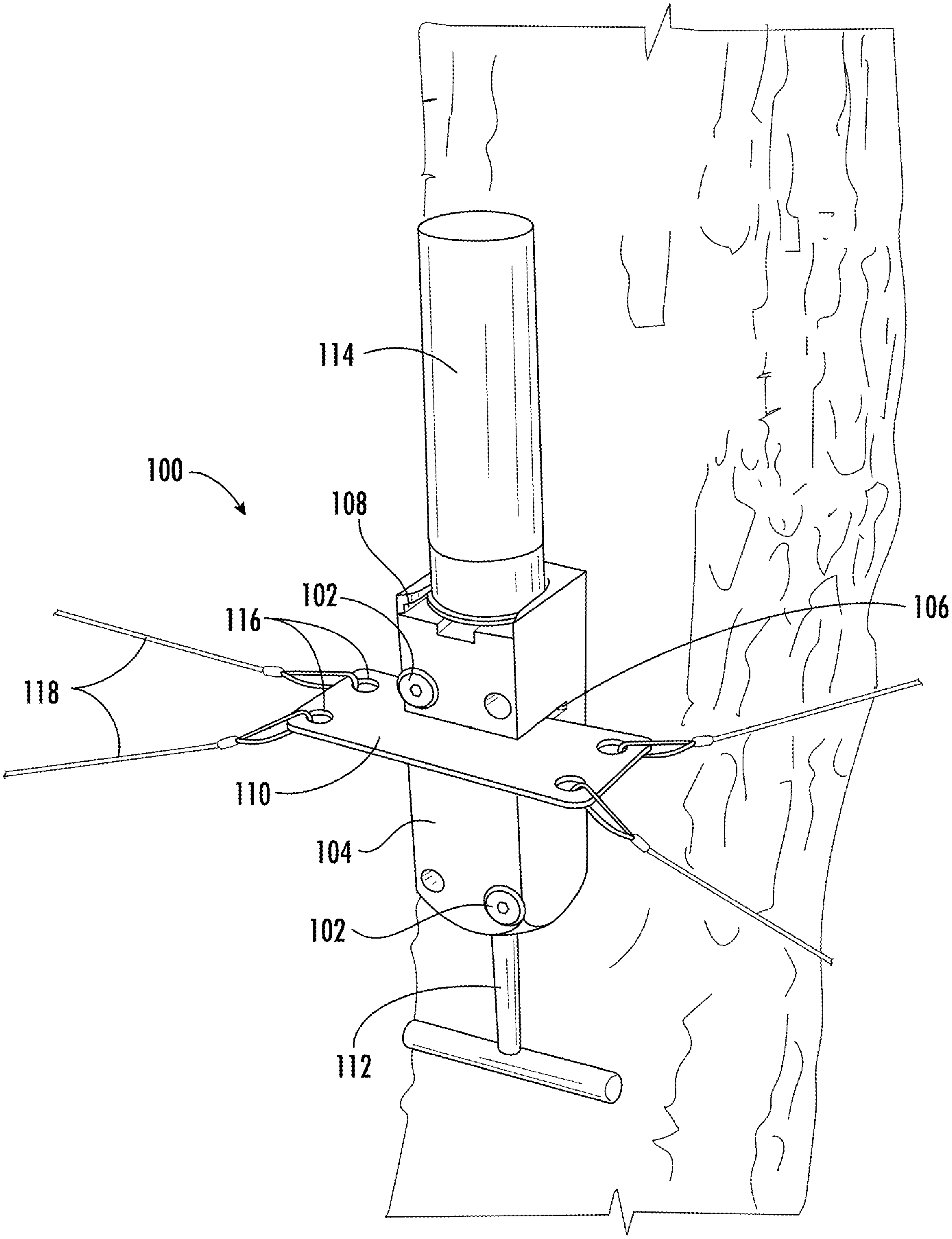
FIG. 1 shows a perspective view of a multi-angle trip alarm apparatus attached to a tree wherein a flash bang shell is engaged with the multi-angle alarm apparatus and wherein trip wires are attached to a firing plate of the multi-angle alarm apparatus.
Figure 2:
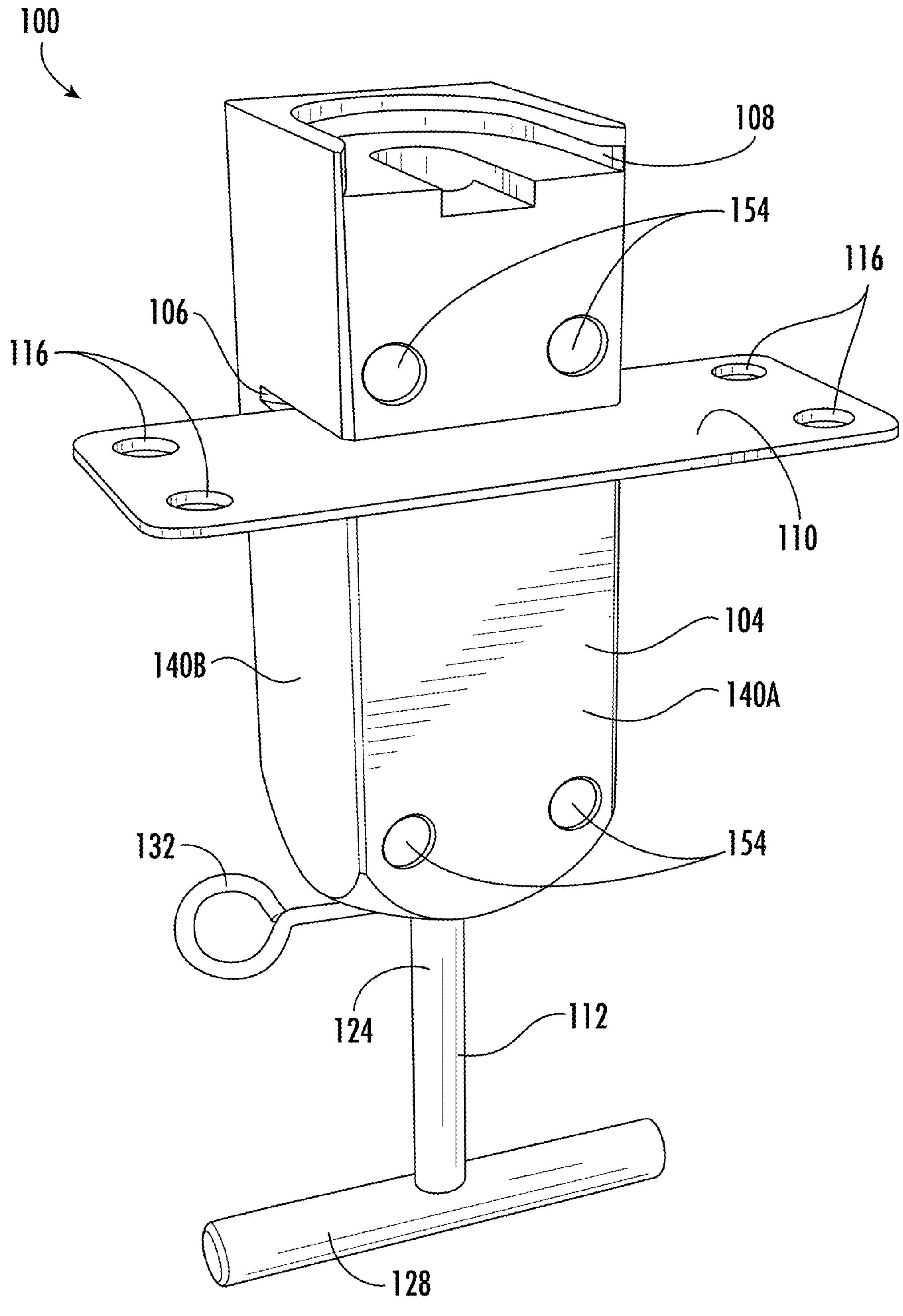
FIG. 2 shows a perspective view of a multi-angle trip alarm apparatus from FIG. 1 including a block, a firing plate, a rod assembly including a rod, and a safety pin.

FIG. 1 shows a multi-angle trip alarm apparatus 100 attached to a tree by a pair of screws 102. The apparatus 100 includes a block 104 including a first slot 106 and a second slot 108, a firing plate 110 configured to slide at least partially inside the first slot 106, and a rod assembly 112. The second slot 108 is configured for receiving the flared end of a flash bang shell, preferably a 12-gauge flash bang shell 114 as shown in FIG. 1. The plate 110 includes a plurality of apertures 116 that can be used to tie wire, string or other similar material to set trip wires 118 in a given area to be monitored.

FIGS. 2-19 show more detailed features of the multi-angle trip alarm apparatus 100 and show how the features work together in a way to provide a device that can provide trip alarm monitoring capability in all horizontal directions—a full 360 degrees around the apparatus 100—which is something that cannot be done with prior art devices as discussed in more detail below.

Figure 3:
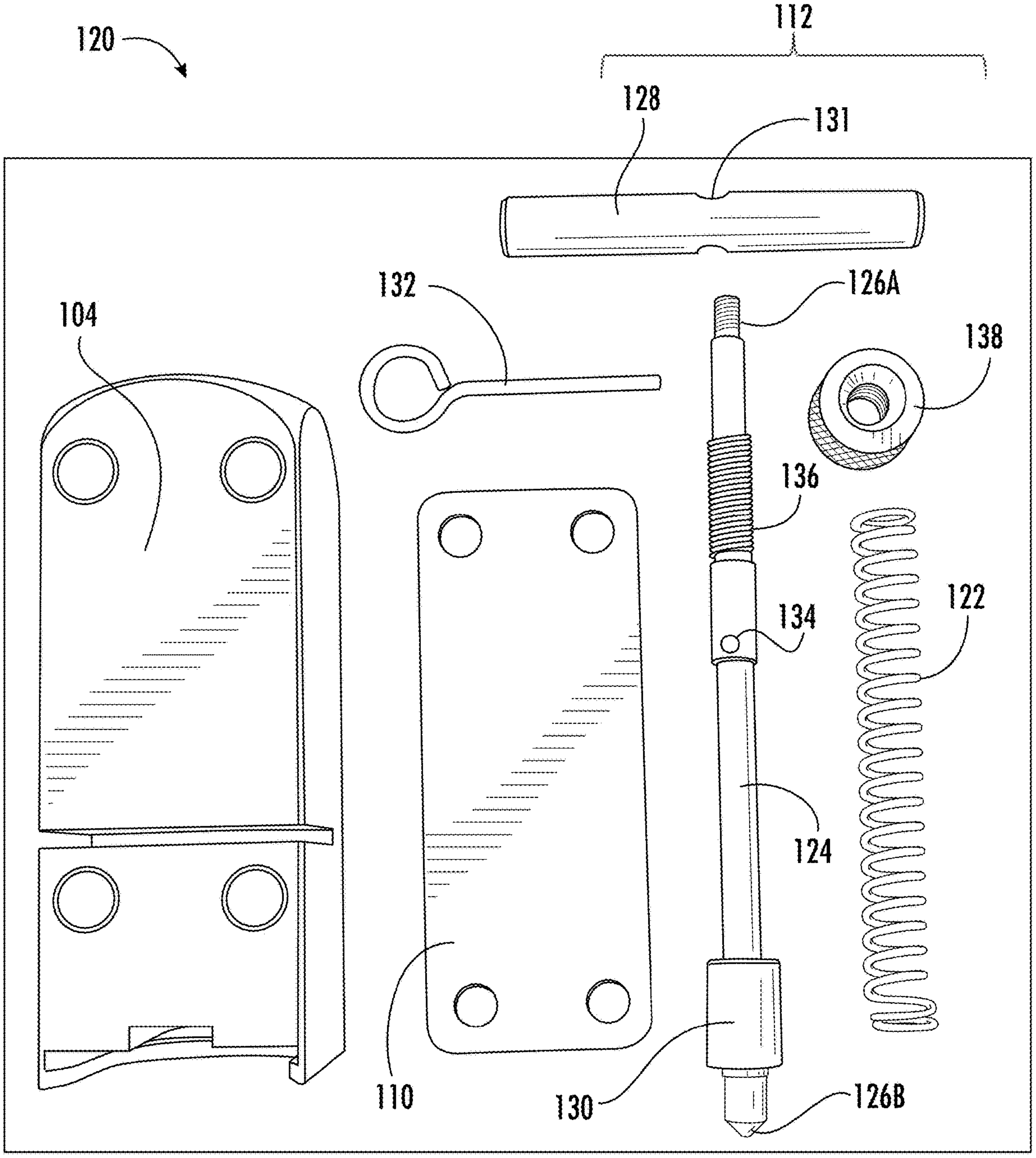
FIG. 3 shows a kit including components that can be combined to form the multi-angle trip alarm apparatus shown in FIG. 1 and FIG. 2.
Figure 4:
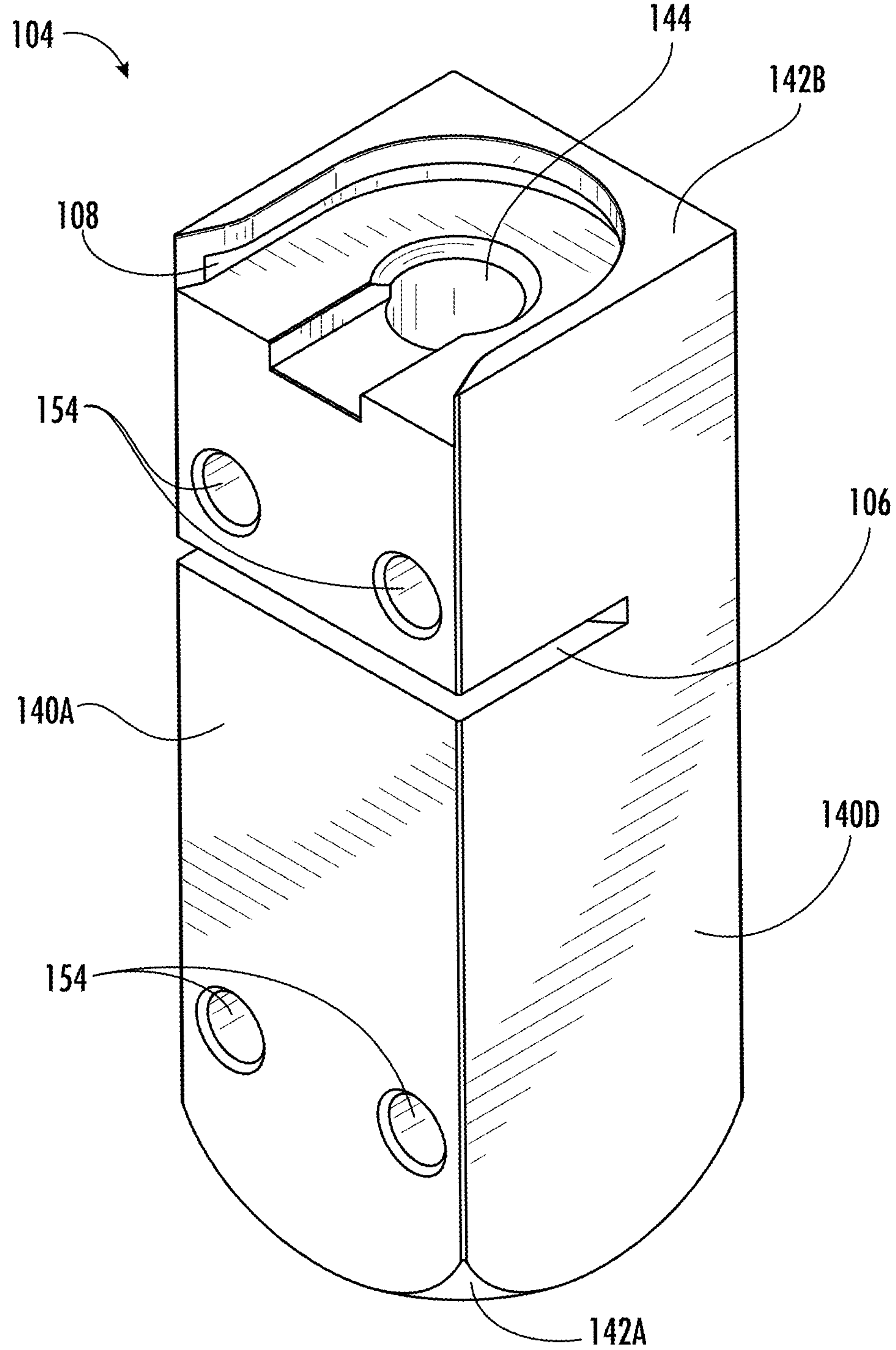
FIG. 4 shows a perspective view of a block which forms part of the multi-angle trip alarm apparatus shown in FIG. 1 and FIG. 2.
Figure 5:
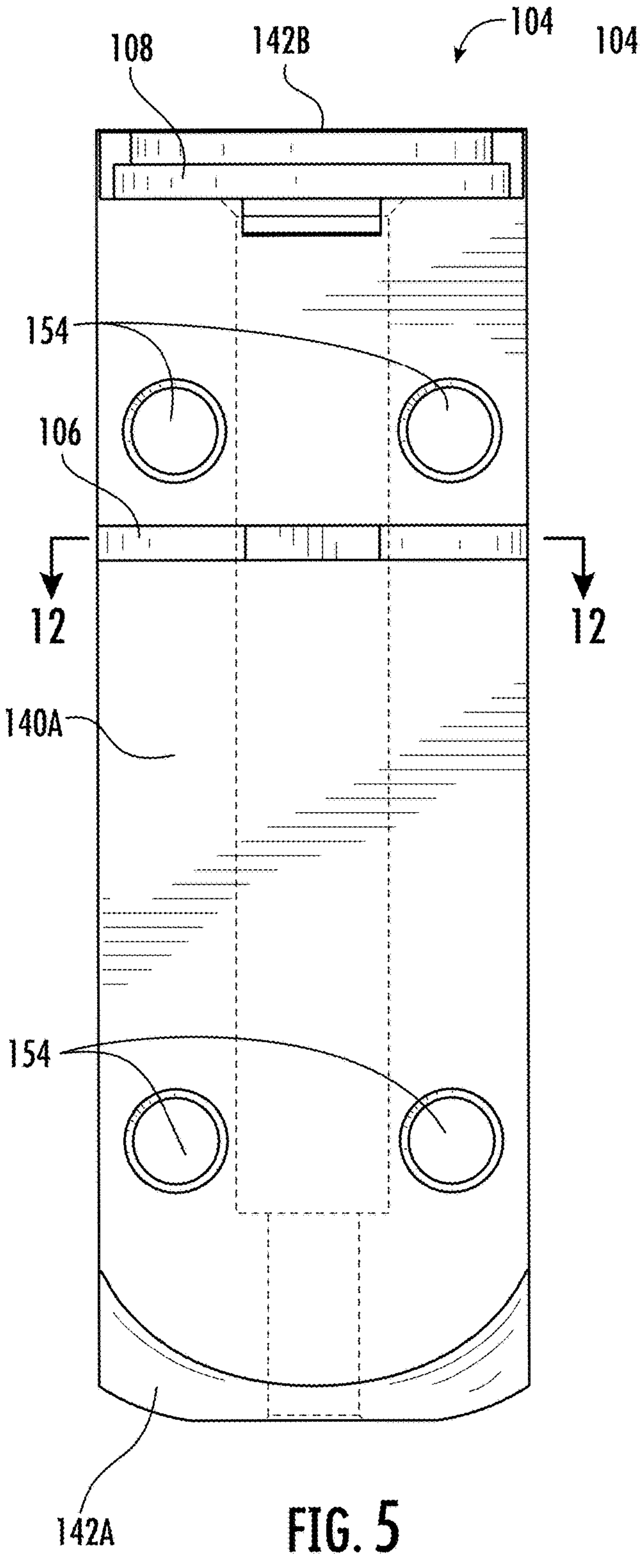
FIG. 5 shows a first lengthwise side of the block shown in FIG. 4.
Figure 6:
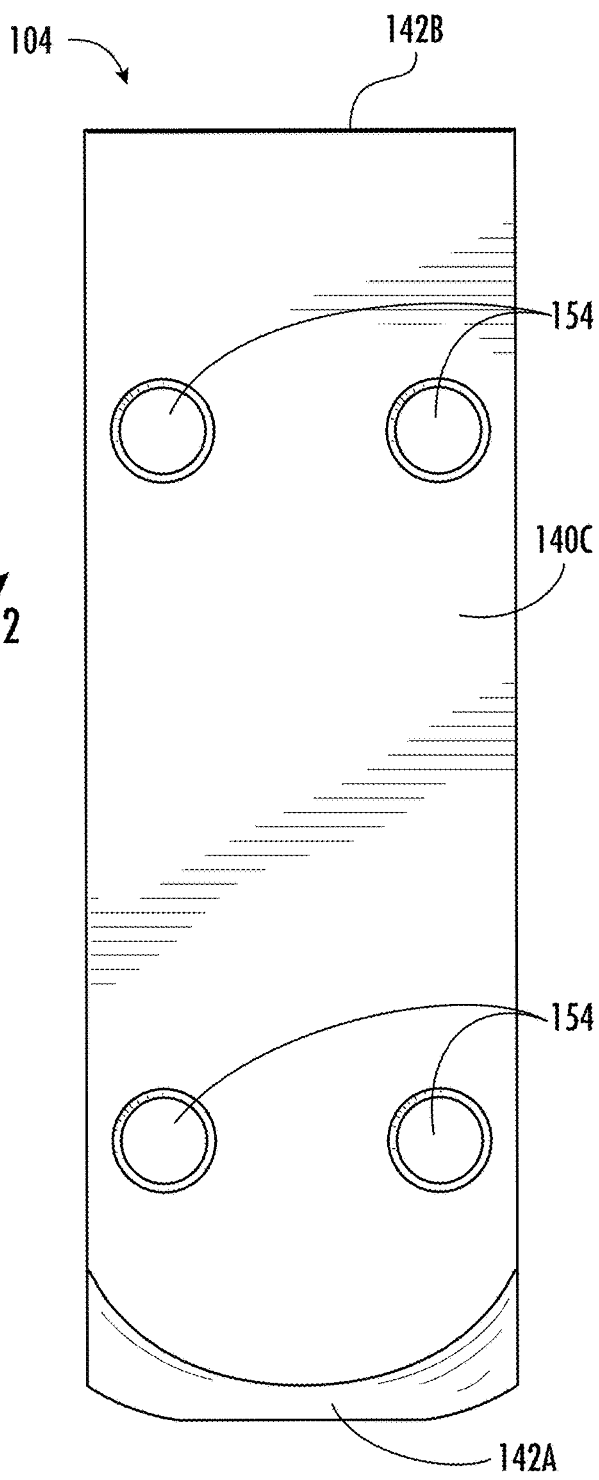
FIG. 6 shows a third lengthwise side of the block shown in FIG. 4 and FIG. 5.
Figure 7:
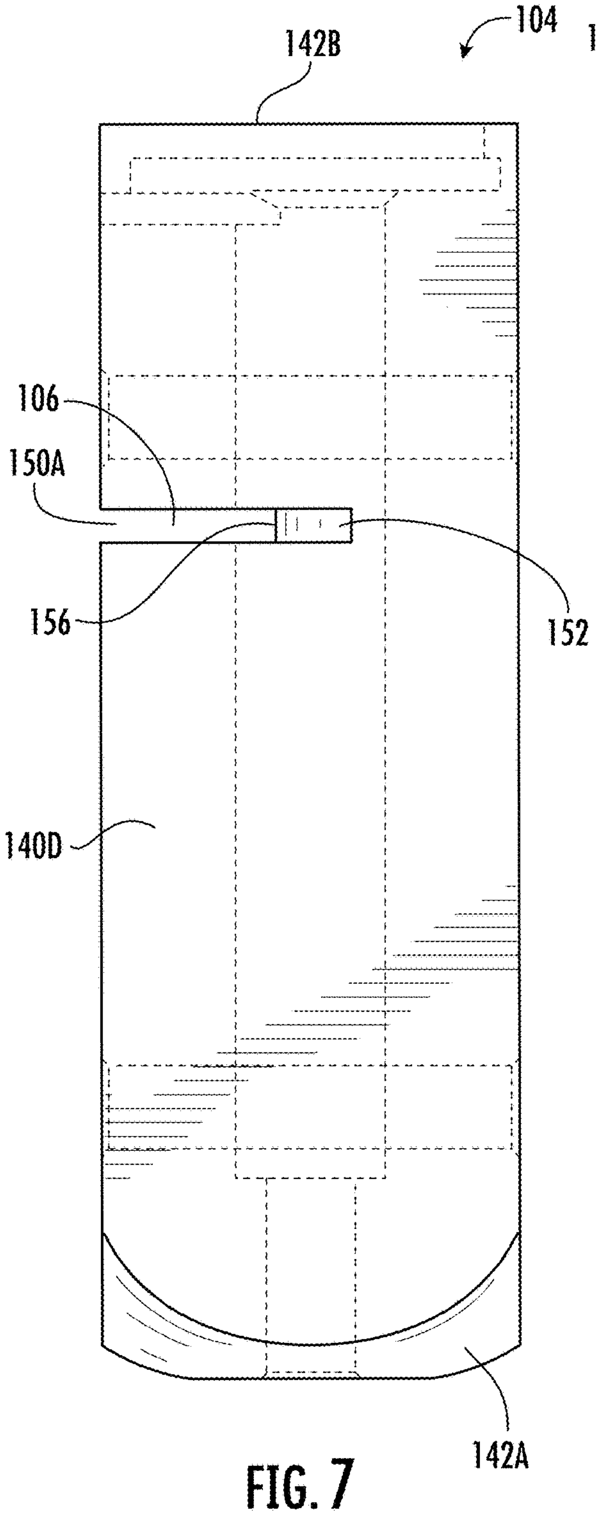
FIG. 7 shows a fourth lengthwise side of the block shown in FIGS. 4-6.
Figure 8:
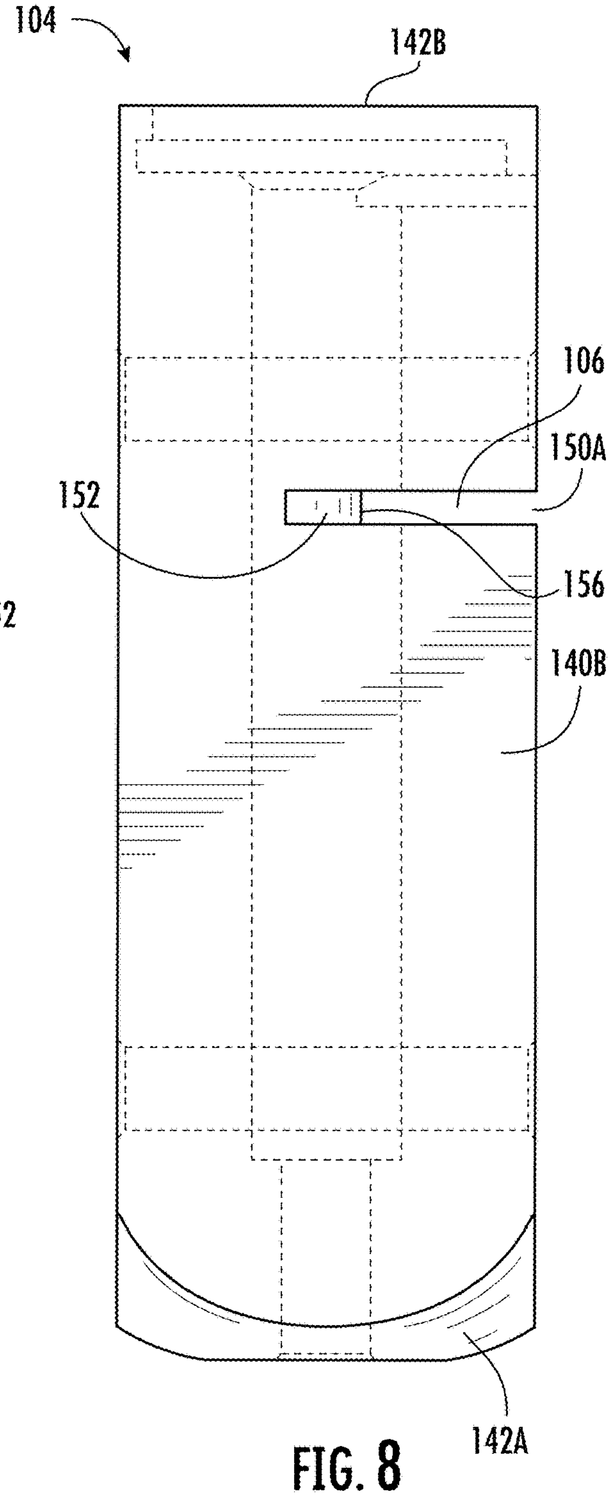
FIG. 8 shows a second lengthwise side of the block shown in FIGS. 4-7.
Figure 9:
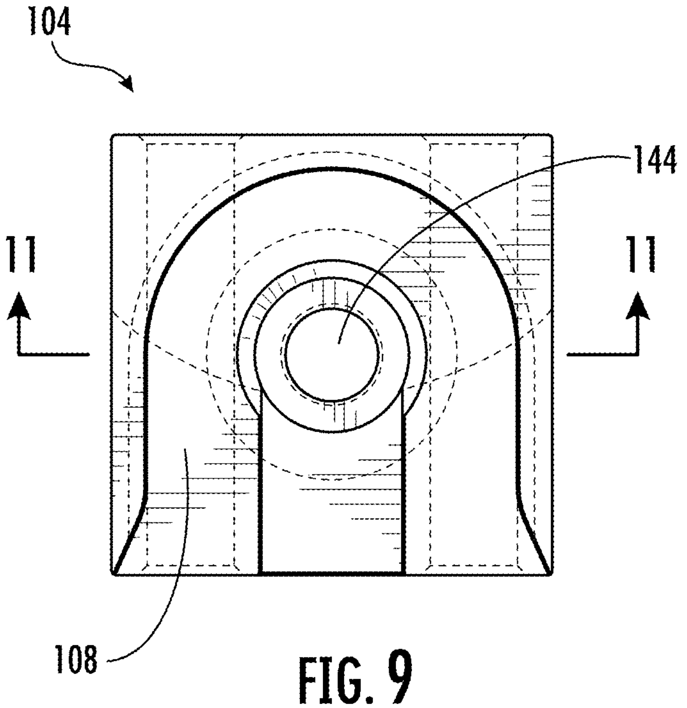
FIG. 9 shows a view of a second end of the block shown in FIGS. 4-8.
Figure 10:
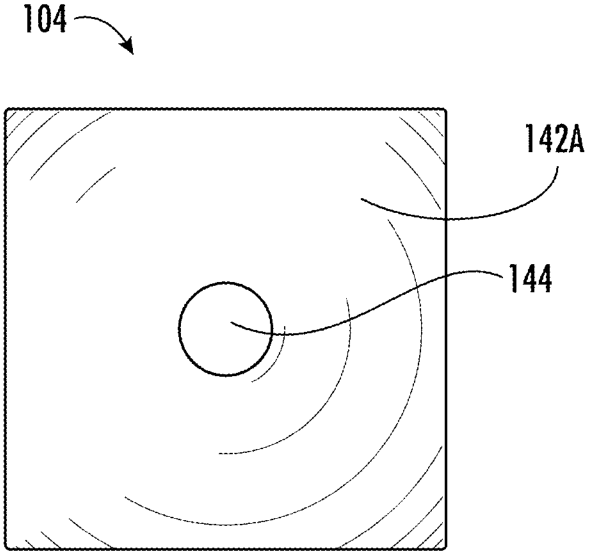
FIG. 10 shows a view of a first end of the block shown in FIGS. 4-9.
Figure 11:
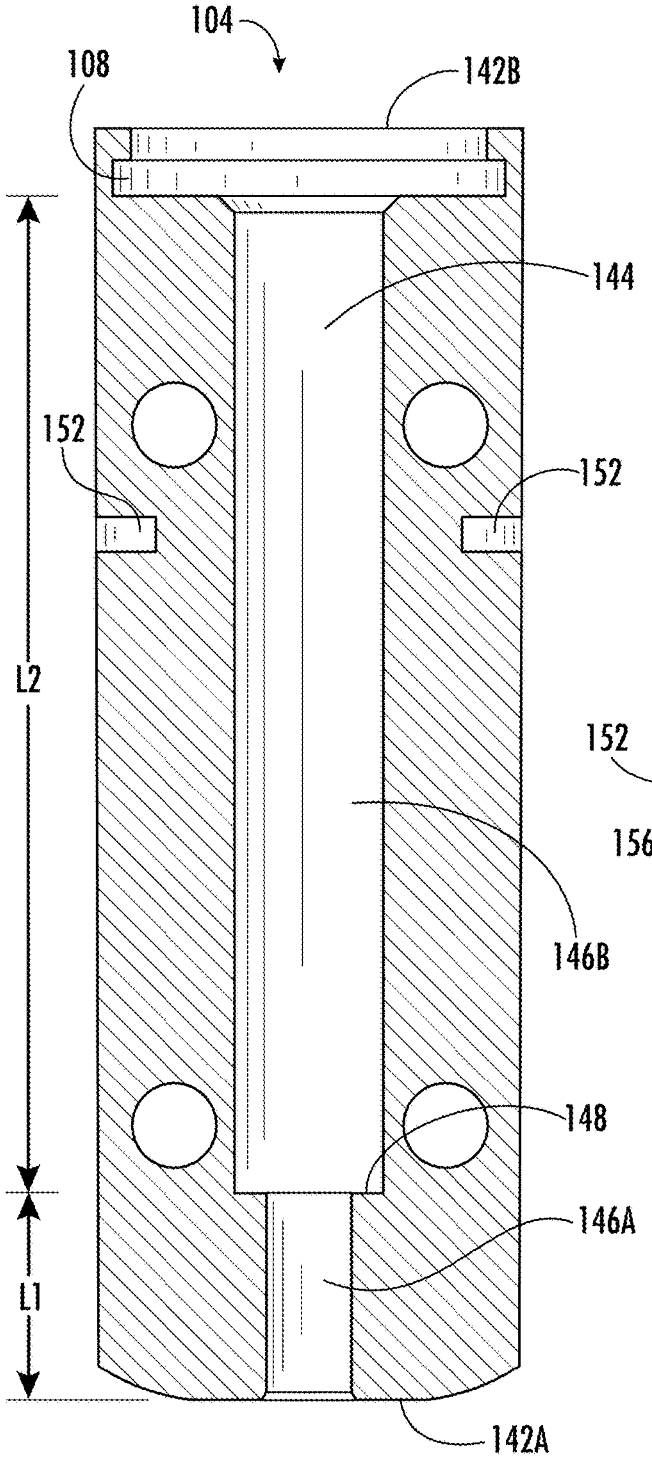
FIG. 11 shows a lengthwise cross-sectional view of the block as cut along line 11-11 in FIG. 9.
Figure 12:
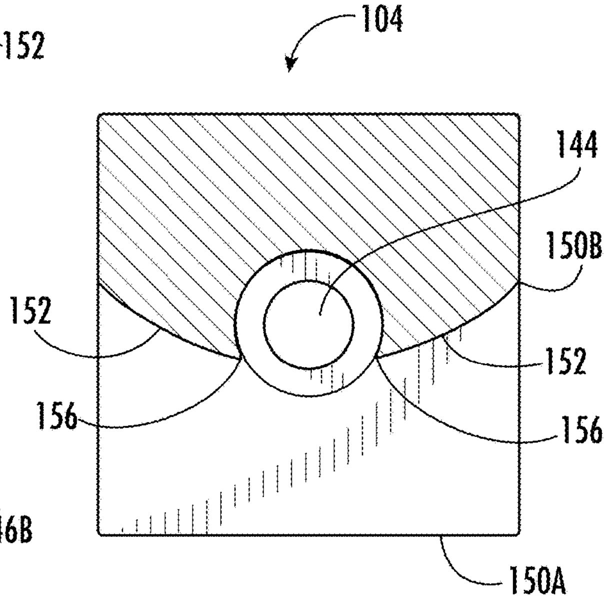
FIG. 12 shows a widthwise cross-sectional view of the block as cut along line 12-12 in FIG. 5.

FIG. 3 shows a multi-angle trip alarm apparatus kit 120. The kit 120 includes the block 104, the firing plate 110, the rod assembly 112, and a coil spring 122. The rod assembly 112 preferably further includes a rod 124 including a first end 126A and a second end 126B, a handle 128 configured to be removably attached to the first end 126A of the rod 124, and a first sleeve 130 attached or otherwise formed proximate to the second end 126B of the rod 124. The first end 126A of the rod 124 is preferably threaded so as to be removably engageable with the handle 128 which preferably includes a handle hole 131 with internal threading. The kit 120 preferably further includes a pin 132 configured to slide into a rod aperture 134. The rod assembly preferably further includes a threaded section 136 along the rod 124 and a second sleeve 138 with internal threading configured to engage with and be moveable along the threaded section 136 of the rod 124.

FIGS. 4-12 show the block 104 including its various features. The block 104 preferably includes a first lengthwise side 140A, a second lengthwise side 140B, a third lengthwise side 140C, a fourth lengthwise side 140D, a first end 142A and a second end 142B. The block 104 includes a lengthwise hole 144 extending lengthwise through the center of the block. The hole 144 includes a narrow section 146A extending a first length L1 of the lengthwise hole 144, and a wide section 146B extending a second length L2 of the lengthwise hole wherein the narrow section 146A and the wide section 146B are demarcated by an interior ridge 148 inside the block 104. The first slot 106 of the block 104 extends into the block 104 starting at a first slot proximal end 150A along the first lengthwise side 140A and extending into a first slot distal end 150B defined by a convex interior wall 152 as shown more clearly in FIG. 5 and FIG. 12. The second slot 108 of the block 104 is oriented widthwise along the second end 142B of the block 104, and the second slot 108 is partially open, facing out the second end 142B of the block 104 and configured for receiving the flared end of a flash bang shell 114 as shown, for example, in FIG. 1. The block 104 preferably further includes a plurality of widthwise holes 154 extending through the block from the first lengthwise side 140A to the third lengthwise side 140C. The block 104 preferably includes four of the widthwise holes 154 as shown, for example, in FIGS. 4-8.

Figure 15:
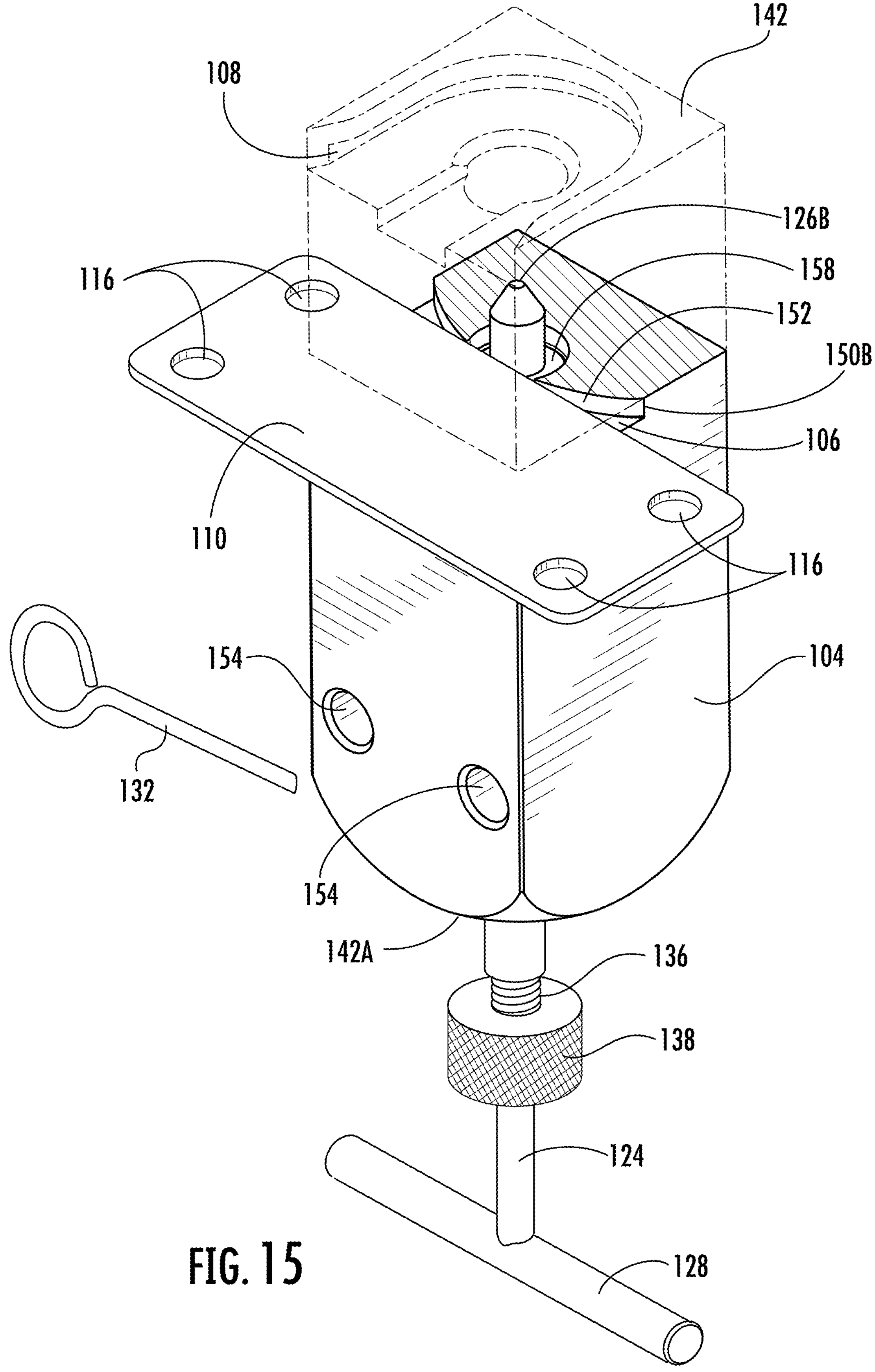
FIG. 15 shows a similar perspective like FIG. 14 but with the firing plate inserted into the first slot and the safety pin removed from the rod.
Figure 17:
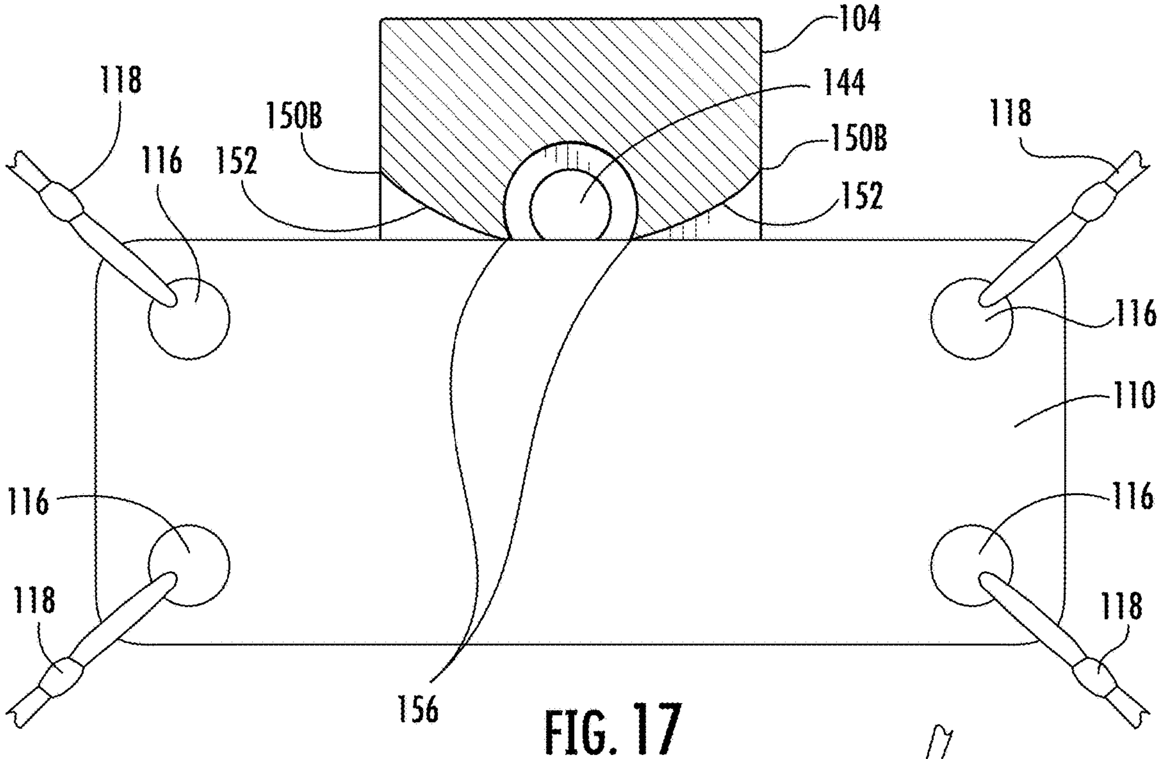
FIG. 17 shows a widthwise cross-sectional view showing the firing plate in the first slot in a set position, engaged with the rod as shown in FIG. 15 and FIG. 16.

The plate 110 is preferably rectangular in shape with four rounded corners. As indicated above, the plate 110 includes the plurality of apertures 116, preferably with one aperture per corner of the plate 110 as shown, for example, in FIGS. 1-3. The plate 110 is configured to fit partially into the first slot 106 of the block 104 to abut against an apex 156 of the convex interior wall 152 as shown in FIG. 15 and FIG. 17. A key function of the plate 110 is to block the rod 124 from firing until triggered by the removal of the plate 110 from the block 104 as discussed in more detail below. Importantly, the plate 110 is sized to extend out beyond the second lengthwise side 140B and the fourth lengthwise side 140D of the block 104 as shown in FIS. 1, 2, and 15-18.

Figure 13:
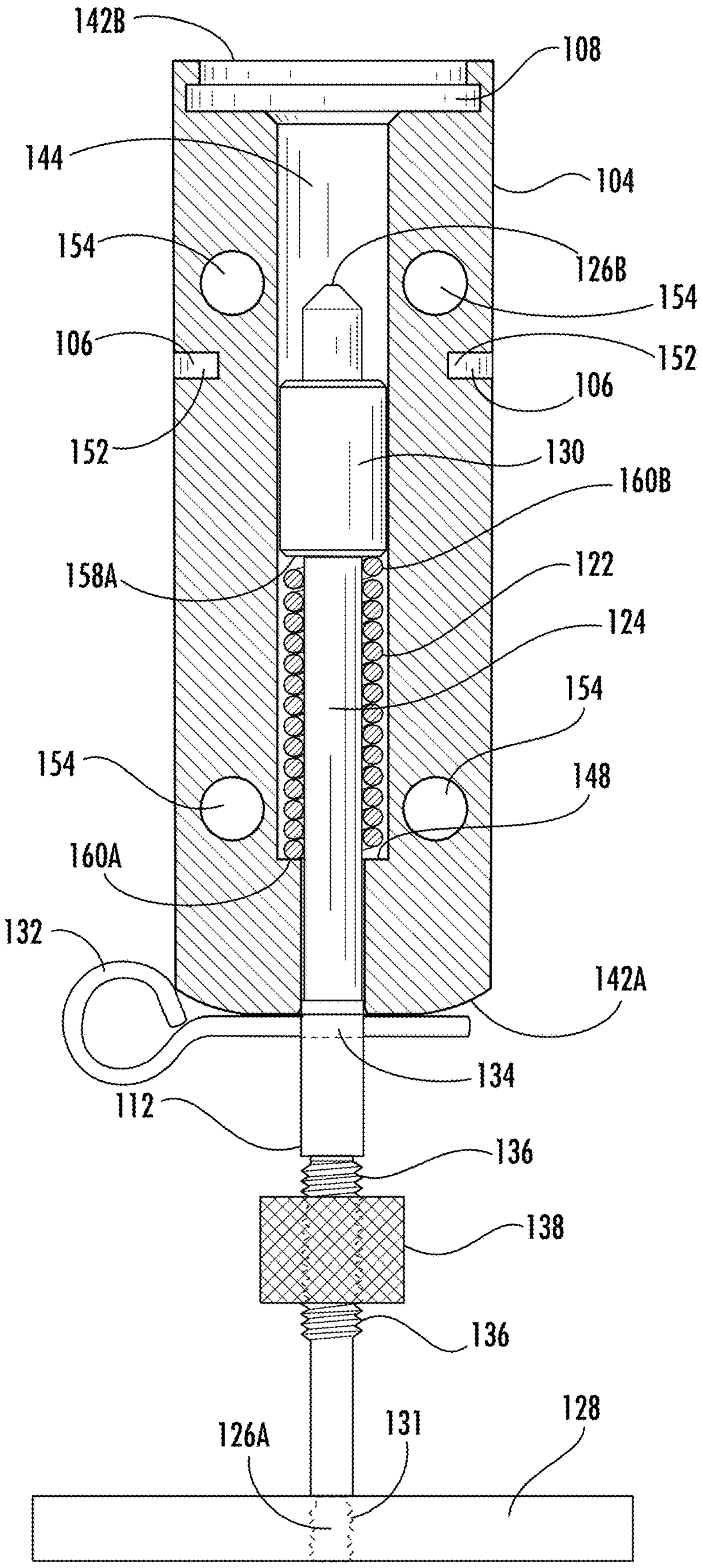
FIG. 13 shows a partial cross-sectional view of the multi-angle trip alarm apparatus shown in FIG. 1 and FIG. 2 and showing a compressed coil spring.
Figure 14:
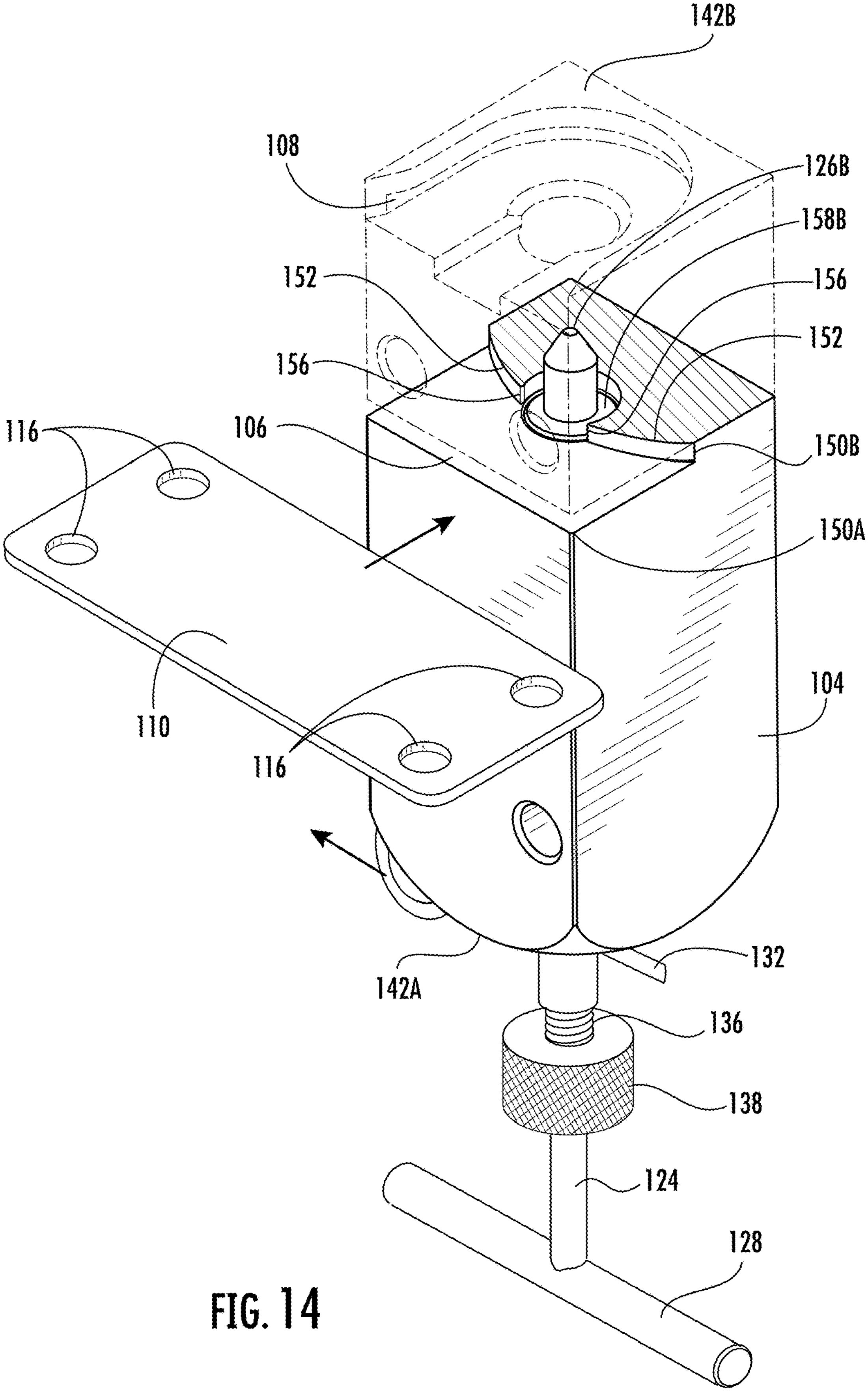
FIG. 14 shows a perspective view of the multi-angle trip alarm apparatus shown in FIG. 13 with an upper portion of the block shown in phantom to reveal the inside of a first slot configured for receiving the firing plate and convex interior wall inside the block, wherein the firing plate abuts against an apex of the convex interior wall when inserted into the first slot.
Figure 16:
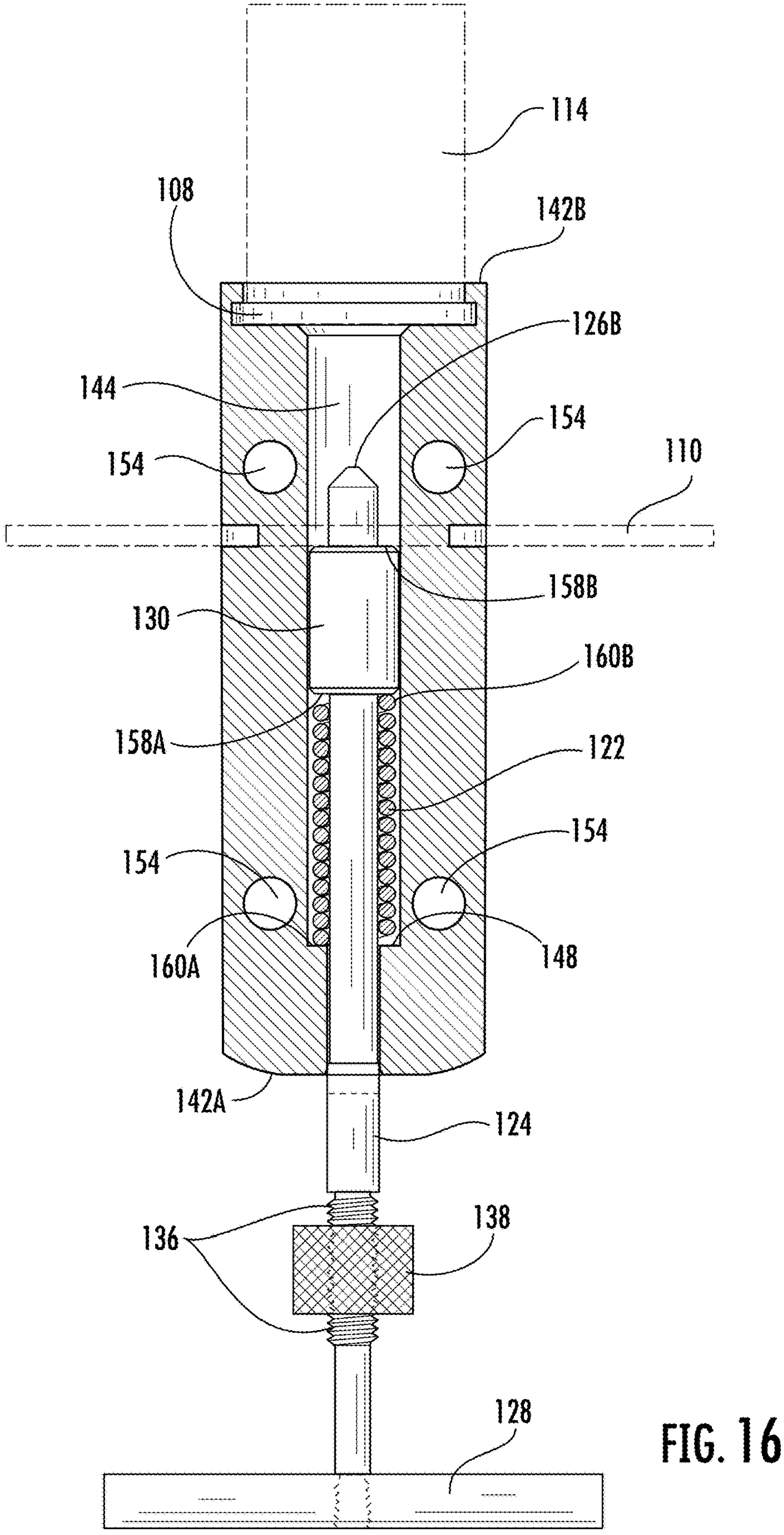
FIG. 16 shows a lengthwise cross-sectional view of the multi-angle trip alarm apparatus shown in FIG. 14 and FIG. 15 with the coil spring compressed exerting pressure between the block and the rod.
Figure 18:
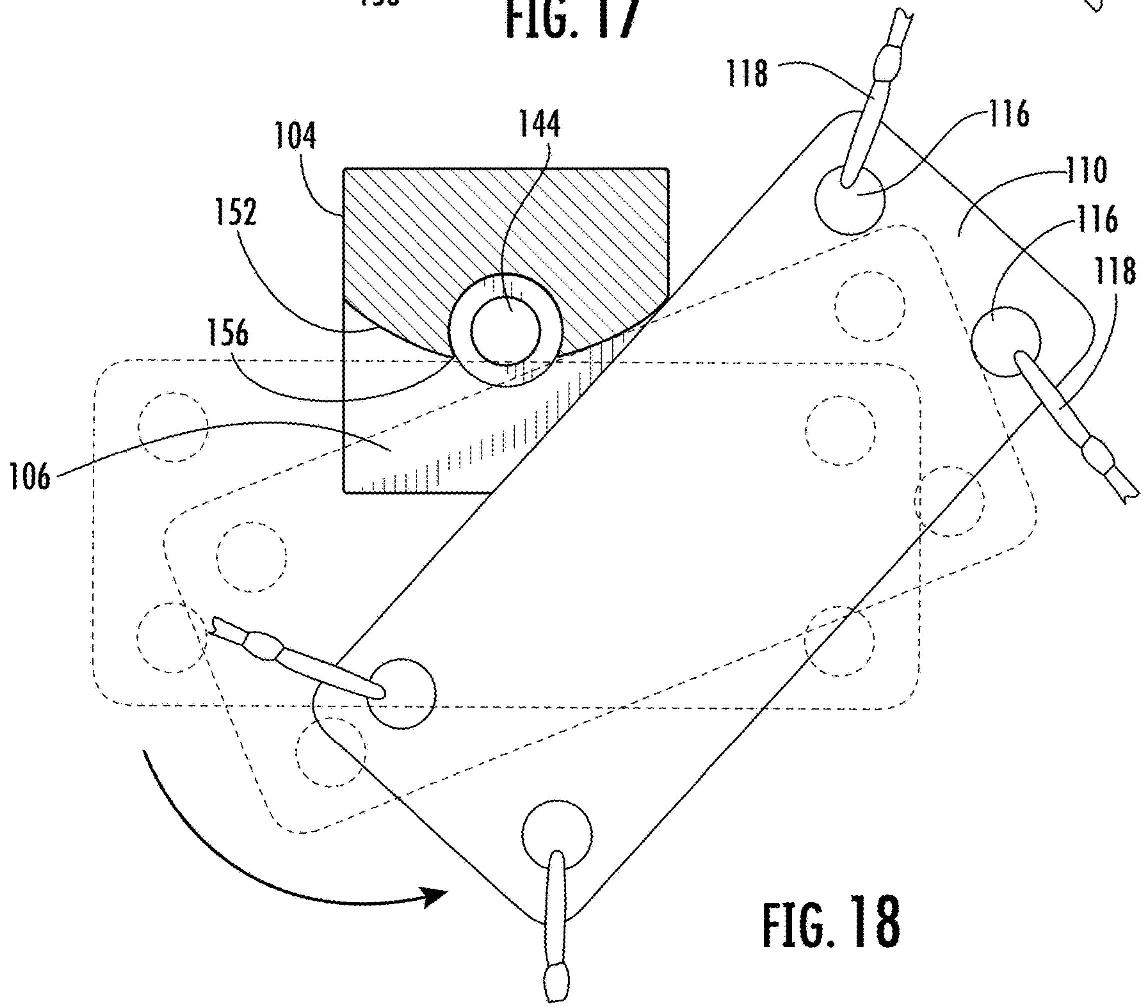
FIG. 18 shows the widthwise cross-sectional view from FIG. 17 in which the multi-angle trip alarm apparatus has been tripped, removing the firing plate as an obstacle to the rod, thereby allowing the rod to rapidly move toward the second end of the block to contact a flash bang shell.

The function of the components of the apparatus 100 are shown in FIGS. 13-19. The cross-sectional view of FIG. 13 shows the rod 124 partially inserted into the lengthwise hole 144 of the block 104. Before firing, the rod assembly 112 is held in check by the plate 110 as shown more clearly in FIG. 15. A second end 158B of the first sleeve 130 is engaged with the plate 110 under pressure as shown in FIG. 15 and FIG. 16. The pressure is caused by the compressed coil spring 122 oriented around the rod 124. As shown in FIG. 13 and FIG. 16, a first end 160A of the coil spring 122 is pressed up against the interior ridge 148 inside the lengthwise hole 144 of the block 104. A second end 160B of the coil spring 122 is pressed up against a first end 158A of the first sleeve 130. When the plate 110 is caused to be moved from its stationary position in FIG. 17 to a moved position as shown in FIG. 18, the first sleeve 130 is no longer held in check by the plate 110 and the apparatus fires, resulting in the configuration shown in FIG. 19 in which the second end 126B of the rod 124 rapidly contacts the base of any flash bang shell 114 in the second slot 108, resulting in the flash bang shell 114 firing.

Figure 20:
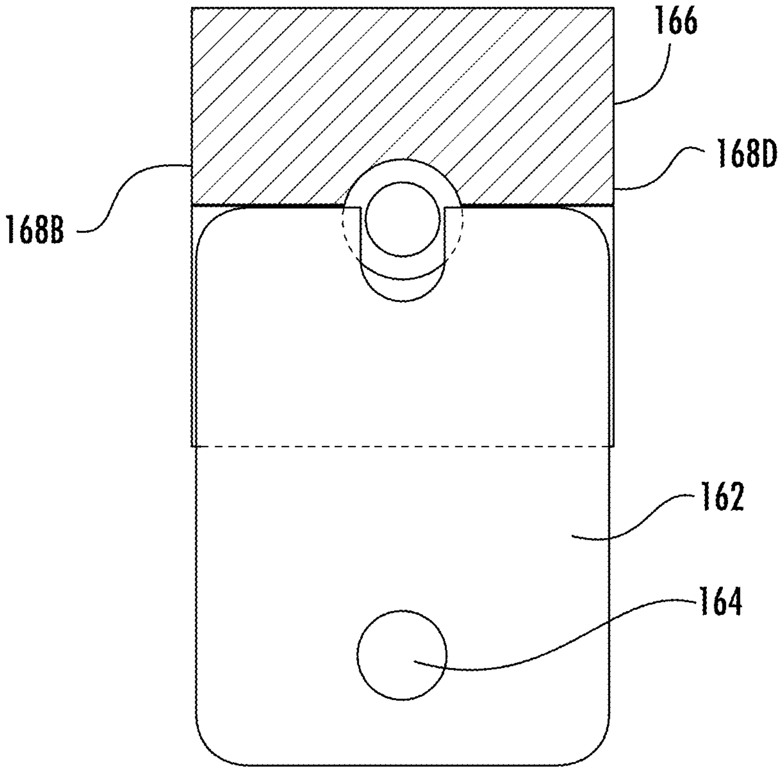
FIG. 20 (PRIOR ART)
FIG. 20 shows a widthwise cross-sectional view or a prior art trip alarm apparatus that, due to design limitations, has limited angles at which the apparatus can be tripped.

The previously described embodiments of the present disclosure have many advantages over the prior art. An important benefit of the multi-angle trip alarm apparatus 100 described herein is that it can be triggered from any horizontal direction, a full 360 degrees around the apparatus 100 as illustrated in FIG. 18. Prior art devices such as the cross-sectional view of a prior art device shown in FIG. 20 are limited to about 180 degrees or less because of the way an analogous plate 162 (including only a single aperture 164) intersects an analogous block 166 and fails to extend beyond an analogous second lengthwise side 168B and an analogous fourth lengthwise side 168D. Two important improvements of the apparatus 100 disclosed herein are (A) the convex interior wall 152 inside the first slot 106 of the block 104 which allows the plate 110 to roll off the block 104 from any direction as shown in FIGS. 18 and (B) the improved plate 110 with multiple apertures 116 which extends out well beyond the second lengthwise side 140B and the fourth lengthwise side 140D of the block 104, thereby allowing extra distance from the block 104 so that the plate 110 can be pulled from any horizontal angle (360 degrees). The convex interior wall 152 is a critical feature of the invention because it allows the multi-angle trip alarm apparatus to be triggered from any horizontal direction. The plate 110 extending out beyond the second lengthwise side 140B and the fourth lengthwise side 140D is critical because it permits a trip wire to be attached to the plate and extend in any horizontal direction around the multi-angle trip alarm apparatus 100.

Figure 19:
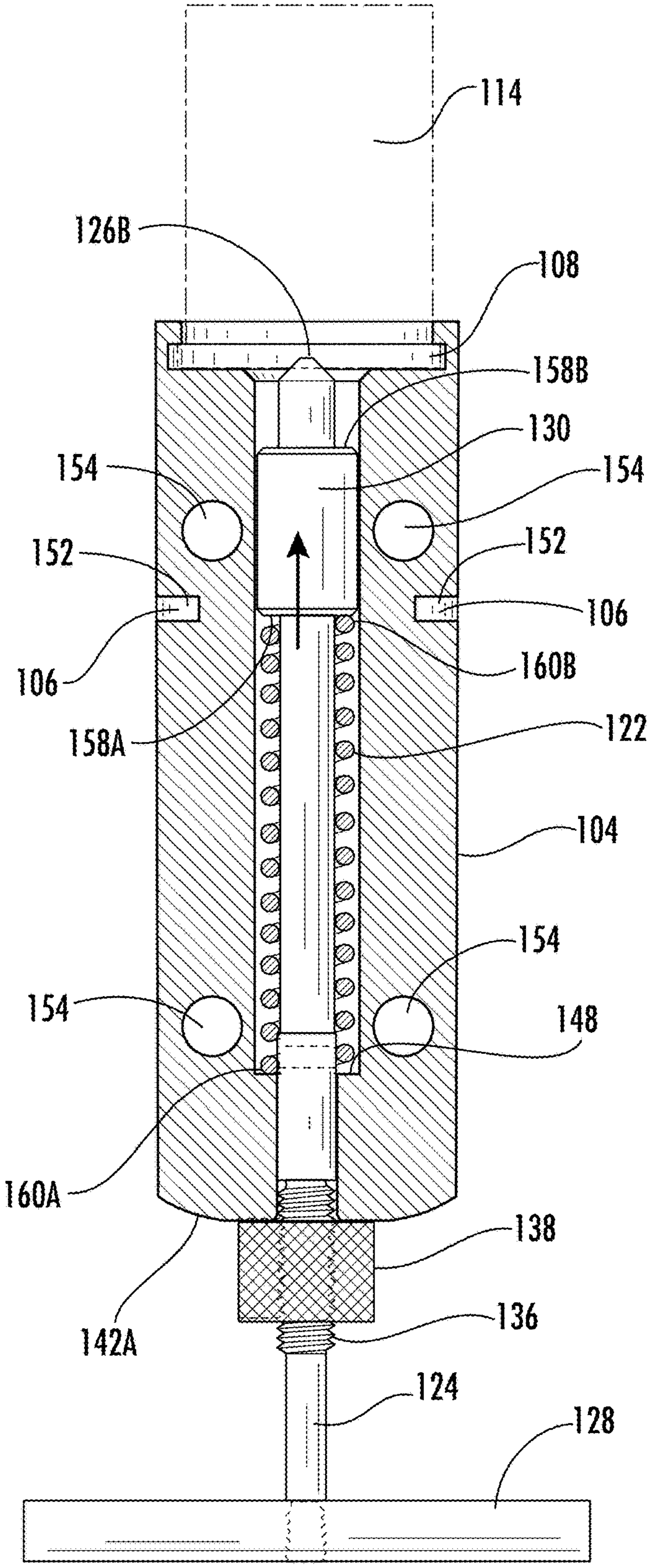
FIG. 19 shows a lengthwise cross-sectional view of the multi-angle trip alarm apparatus after it has been tripped, thereby releasing the pressure caused by the compressed coil spring and allowing the rod to rapidly move toward the second end of the block to ignite a flash bang shell.

Another important improvement in some embodiments of the multi-angle trip alarm apparatus 100 described herein includes the adjustable triggering capabilities of the rod assembly 112. The threaded section 136 of the rod 124 and the second sleeve 138 located thereon provide a way to adjust the length at which the second end 126B of the rod 124 extends out from the second end 142B of the block 104 when the apparatus 100 is triggered and fired. As shown in FIG. 19, the second sleeve 138 contacts the first end 142A of the block which prevents the rod 124 from moving further through the lengthwise hole 144. Because of threading inside the second sleeve 138, the second sleeve 138 can be selectively moved along the threaded section 136 of the rod 124 to either allow for the second end 126B of the rod 124 to either extend further out of the second end 142B of the block 104 when fired or to lessen the extent to which the second end 126B of the rod 124 extends out of the second end 142B of the block 104 when fired. A reason this is important is that different sized flash bang shells might be used which might require an adapter device which might place such shells further away from the block 104 or closer to the block 104. If a shell is farther away from the block 104, it is desirable for the second end 126B of the rod 124 to extend further out of the second end 142B of the block 104 when triggered. On the other hand, if a shell or adapter is closer to the block 104, it is desirable for the second end 126B of the rod 124 to extend less out of the second end 142B of the block 104 when triggered to prevent damage to such adapter and/or shell.

Another helpful feature of some embodiments of the multi-angle trip alarm apparatus 100 described herein is the pin 132 which can be inserted through the rod aperture 134 as a safety to prevent the apparatus 100 from being accidentally triggered until a user is ready for the apparatus to be set. This feature is shown, for example, in FIG. 13. After the plate 110 is inserted into the first slot 106 to engage with the second end 158B of the first sleeve 130 and the apparatus 100 is placed onto a tree or other object and set, the safety pin 132 can be removed as shown from FIG. 14 to FIG. 15.

The various components of the apparatus 100 described herein are preferably made of metal, but other materials can be used to form the various components of the apparatus 100 including, for example, polymer-based materials. Although different sizes and dimensions are possible and covered by this disclosure, in some embodiments the block 104 is approximately 2.75 inches long. The first slot depth to the apex 156 of the convex interior wall from the first slot proximal end 150A is preferably about 0.41 inches, and the first slot depth to the first slot distal end 150B from the first slot proximal end 150A is preferably about 0.626 inches. The lengthwise hole 144 preferably has a round cross-section. In the narrow section 146A, the diameter of the lengthwise hole 144 is preferably about 0.33 inches. In the wide section 146B, the diameter of the lengthwise hole 144 is preferably about 0.2 inches. The first length L1 is preferably about 0.438 inches, and the second length L2 is preferably about 2.312 inches. The diameter of the rod 124 is preferably about 0.18 inches. The diameter of the first sleeve 130 is preferably about 0.314 inches. The outside diameter of the second sleeve 138 is preferably about 0.314 inches. The length of the plate 110 is preferably about 2.5 inches, and the width of the plate 110 is preferably about 1 inch.

Figure 21:
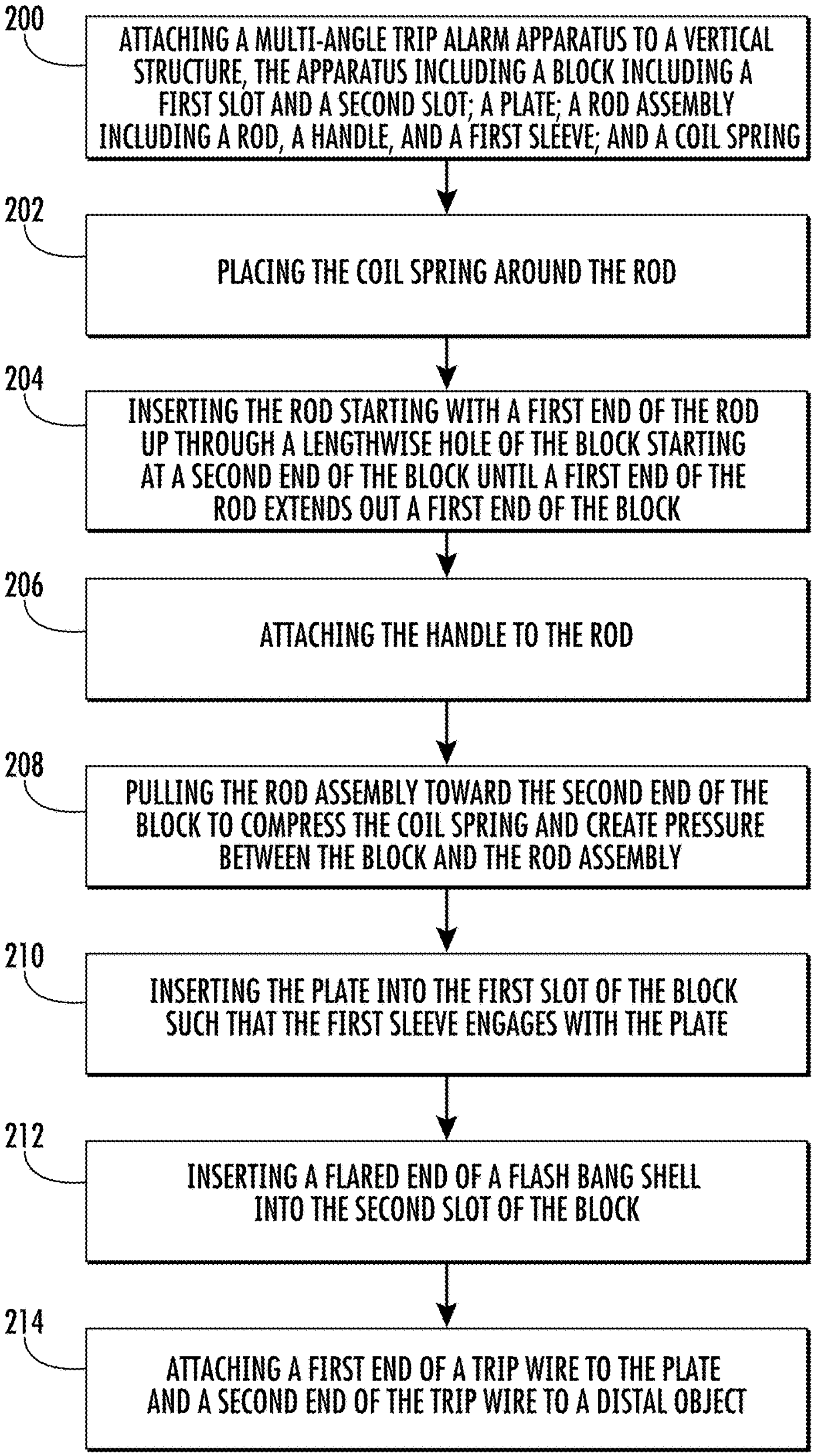
FIG. 21 shows a method for setting the multi-angle trip alarm apparatus shown in FIGS.

In addition to the kit 120 and apparatus 100 described above, a method for using the kit 120 and apparatus 100 is also provided as shown in FIG. 21. The method preferably includes attaching a multi-angle trip alarm apparatus 100 (including, e.g., the block 104) to a vertical structure (200); placing the coil spring 122 around the rod 124 (202); inserting the rod 124 starting with the first end 126A of the rod 124 up through the lengthwise hole 144 of the block 104 starting at the second end 142B of the block 104 until the first end 126A of the rod 124 extends out the first end 142A of the block 104 (204); attaching the handle 128 to the rod 124 (206); pulling the rod assembly 112 toward the first end 142A of the block 104 to compress the coil spring 122 and create pressure between the block 104 and the rod assembly 112 (208); and inserting the plate 110 into the first slot 106 such that the first sleeve 130 engages with the plate 110 (210). Another step may include inserting the flared end of a flash bang shell into the second slot 108 of the block 104 (212). Another step may include attaching a first end of a trip wire 118 to the plate 110 and a second end of the trip wire to a distal object (214). Step 214 may further include attaching a first end of a second trip wire to the plate and a second end of the second trip wire to a second distal object, attaching a first end of a third trip wire to the plate and a second end of the third trip wire to a third distal object, and attaching a first end of a fourth trip wire to the plate and a second end of the fourth trip wire to a fourth distal object. Such distal objects could be trees or other secured structures to which one could tie or otherwise attach a trip wire. Some of the various steps described above can be performed in different orders and the order in which such steps are numbered and listed above and in FIG. 21 is not intended to control or otherwise be exhaustive.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A multi-angle trip alarm apparatus kit, the kit comprising:

a. a block comprising:
   i. a first lengthwise side, a second lengthwise side, a third lengthwise side, a fourth lengthwise side, a first end, and a second end;
   ii. a lengthwise hole extending lengthwise through the center of the block, the hole including a narrow section extending a first length of the lengthwise hole and a wide section extending a second length of the lengthwise hole wherein the narrow section and the wide section are separated by an interior ridge inside the block; and
   iii. a first slot extending into the block starting at a first slot proximal end along the first lengthwise side and extending to a first slot distal end defined by a symmetrical convex interior wall;
b. a plate configured to slide into and rest inside the first slot of the block wherein the plate is sized to extend out beyond the block, the plate including a plurality of apertures therethrough;
c. a rod assembly configured to fit inside the lengthwise hole of the block, the rod assembly comprising:
   i. a rod including a first end and a second end;
   ii. a handle attached along the first end of the rod; and
   iii. a first sleeve attached proximate to the second end of the rod; and
d. a coil spring including a first spring end and a second spring end, the coil spring configured to fit around the rod and be bounded at the first spring end by the interior ridge inside the block and at the second spring end by the first sleeve.

2. The multi-angle trip alarm apparatus kit of claim 1 further comprising:

a. a threaded section proximate to the first end of the rod; and
b. a second sleeve including interior threading operable to mate with the threaded section of the rod so that the second sleeve is operable to be adjusted up or down along the threaded section of the rod.

3. The kit of claim 1 further comprising:

a. a rod aperture extending widthwise through the rod; and
b. a pin configured to extend through the rod aperture.

4. The multi-angle trip alarm apparatus kit of claim 1 wherein the plate comprises a rectangular shape including four rounded corners and wherein the plurality of apertures comprises four apertures, one aperture proximate to each corner of the plate.

5. The multi-angle trip alarm apparatus kit of claim 1 wherein the block further comprises a plurality of widthwise holes extending through the block from the first lengthwise side to the third lengthwise side.

6. The multi-angle trip alarm apparatus kit of claim 1 wherein the block further comprises a second slot oriented widthwise along the second end of the block wherein the second slot is partially open, facing out the second end of the block, and wherein the second slot is configured for receiving the flared end of a flash bang shell.

7. A multi-angle trip alarm apparatus comprising:

a. a block comprising:
   i. a first lengthwise side, a second lengthwise side, a third lengthwise side, a fourth lengthwise side, a first end, and a second end;
   ii. a lengthwise hole extending lengthwise through the center of the block, the hole including a narrow section extending a first length of the lengthwise hole and a wide section extending a second length of the lengthwise hole wherein the narrow section and the wide section are separated by an interior ridge inside the block; and
   iii. a first slot extending into the block starting at a slot proximal end along the first lengthwise side and extending to a slot distal end defined by a symmetrical convex interior wall;
b. a plate resting inside the first slot of the block wherein the plate extends out beyond the block, the plate including a plurality of apertures therethrough;
c. a rod assembly comprising:
   i. a rod including a first end and a second end wherein the rod extends into the lengthwise hole of the block;
   ii. a handle attached along the first end of the rod; and
   iii. a first sleeve attached proximate to the second end of the rod wherein a first end of the first sleeve is engaged with a first edge of the plate; and
d. a coil spring including a first spring end and a second spring end, the coil spring located around the rod wherein the coil spring is bounded in a compressed state under pressure at the first spring end by the interior ridge inside the block and at the second spring end by a second end of the first sleeve;

wherein the coil spring, block, and rod assembly are operable to eject the second end of the rod out the second end of the block if the plate is moved in a way that permits the first sleeve of the rod assembly to slip by the plate through the lengthwise hole in the block.

8. The plate of claim 7 wherein the plate comprises a rectangular shape including four rounded corners and wherein the plurality of apertures comprises four apertures, one aperture proximate to each corner of the plate.

9. The multi-angle trip alarm apparatus of claim 7 wherein the block further comprises a plurality of widthwise holes extending through the block from the first lengthwise side to the third lengthwise side.

10. The multi-angle trip alarm apparatus of claim 7 wherein the block further comprises a second slot oriented widthwise along the second end of the block wherein the second slot is partially open, facing out the second end of the block and wherein the second slot is configured for receiving the flared end of a flash bang shell.

11. The multi-angle trip alarm apparatus of claim 7 wherein the multi-angle trip alarm apparatus is configured such that the plate can be pulled from any horizontal direction, a full 360 degrees around the multi-angle trip alarm apparatus.

12. A method for setting a multi-angle trip alarm apparatus, the method comprising:

a. attaching a multi-angle trip alarm apparatus to a vertical structure, the multi-angle trip alarm apparatus comprising:

i. a block comprising:

1. A first lengthwise side, a second lengthwise side, a third lengthwise side, a fourth lengthwise side, a first end, and a second end;
2. A lengthwise hole extending lengthwise through the center of the block, the hole including a narrow section extending a first length of the lengthwise hole and a wide section extending a second length of the lengthwise hole wherein the narrow section and the wide section are separated by an interior ridge inside the block; and
3. A first slot extending into the block starting at a first slot proximal end along the first lengthwise side and extending to a first slot distal end defined by a symmetrical convex interior wall;

ii. a plate configured to slide into and rest inside the first slot of the block wherein the plate is sized to extend out beyond the block, the plate including a plurality of apertures therethrough;

iii. a rod assembly configured to at least partially fit inside the lengthwise hole of the block, the rod assembly comprising:

1. A rod including a first end and a second end;
2. A handle configured to be attached along the first end of the rod; and
3. A first sleeve attached proximate to the second end of the rod; and iv. a coil spring including a first spring end and a second spring end, the coil spring configured to fit around the rod and be bounded at the first spring end by the interior ridge inside the block and at the second spring end by the first sleeve;

b. placing the coil spring around the rod;

c. inserting the rod starting with the first end of the rod up through the lengthwise hole of the block starting at the second end of the block until the first end of the rod extends out the first end of the block;

d. attaching the handle to the rod;

e. pulling the rod assembly toward the first end of the block to compress the coil spring and create pressure between the block and the rod assembly; and f. inserting the plate into the first slot such that the first sleeve is engaged with the plate.

13. The method of claim 12 wherein the block of the multi-angle trip alarm apparatus further comprises a second slot oriented widthwise along the second end of the block wherein the second slot is partially open, facing out the second end of the block and wherein the second slot is configured for receiving the flared end of a flash bang shell, the method further comprising inserting a flared end of a flash bang shell into the second slot.

14. The method of claim 12 further comprising attaching a first end of a first trip wire to the plate and a second end of the first trip wire to a first distal object.

15. The method of claim 14 further comprising attaching a first end of a second trip wire to the plate and a second end of the second trip wire to a second distal object, attaching a first end of a third trip wire to the plate and a second end of the third trip wire to a third distal object, and attaching a first end of a fourth trip wire to the plate and a second end of the fourth trip wire to a fourth distal object.

* * * * *